United States Patent [19]
Yagi et al.

[11] Patent Number: 5,484,528
[45] Date of Patent: Jan. 16, 1996

[54] FILTRATION EQUIPMENT FOR HOLLOW FIBER MODULE

[75] Inventors: Masayoshi Yagi, Miyoshi; Yoshio Sunaoka, Higashimatsuyama, both of Japan

[73] Assignee: Organo Corporation, Tokyo, Japan

[21] Appl. No.: 296,834

[22] Filed: Aug. 26, 1994

[30] Foreign Application Priority Data

Sep. 13, 1993 [JP] Japan ................................ 5-227259

[51] Int. Cl.$^6$ ............................................. B01D 63/00
[52] U.S. Cl. ......................... 210/321.8; 210/321.79; 210/321.87; 210/232; 210/456; 210/323.2; 96/10
[58] Field of Search ................... 210/321.8, 321.89, 210/321.87, 321.78, 321.79, 456, 500.23, 350, 357, 323.2, 232; 96/10

[56] References Cited

U.S. PATENT DOCUMENTS

| | | | |
|---|---|---|---|
| 3,279,608 | 10/1966 | Soriente et al. | 210/323.2 |
| 3,615,016 | 10/1971 | Soriente et al. | 210/323.2 |
| 4,775,471 | 10/1988 | Nagai et al. | 210/323.2 |
| 4,876,006 | 10/1989 | Ohkubo et al. | 210/321.89 |
| 5,128,038 | 7/1992 | Slavitsche et al. | 210/323.2 |

FOREIGN PATENT DOCUMENTS

| | | | |
|---|---|---|---|
| 62-197106 | 8/1987 | Japan . | |
| 958330 | 9/1982 | U.S.S.R. | 210/323.2 |

Primary Examiner—Ana M. Fortuna
Attorney, Agent, or Firm—Sprung Horn Kramer & Woods

[57] ABSTRACT

A filter vessel is partitioned into a first, second and third compartments with upper and lower watertight partitions. A plurality of hollow fiber modules each having upper and lower filtrate outlet ports are vertically disposed in the second compartment, and upward-detachably fixed in the filter vessel. Each hollow fiber module is watertightly joined with a lower water collection tube communicating with the third compartment by means of a jointing means capable of vertical elastic movement. Feed water fed into the second compartment is filtered through walls of porous hollow fibers in the hollow fiber modules into the bores of the porous hollow fibers, through which the filtrate is conducted into the first compartment via the upper filtrate outlet ports of the hollow fiber modules as well as into the third compartment via the lower filtrate outlet ports of the hollow fiber modules and lower water collection tubes joined with the respective hollow fiber modules. The filtrate collected in the first and third compartments is then discharged therefrom out of the filter column.

13 Claims, 9 Drawing Sheets

FILTRATION EQUIPMENT FOR HOLLOW FIBER MODULE

BACKGROUND OF THE INVENTION

1. Field of the Invention

The present invention relates to filtration equipment using a hollow fiber module(s), which is used to filter fluids, or liquids, such as condensate water, obtained in a nuclear or thermoelectric power plant, and waste water, and particularly to the structure of a fixture for a hollow fiber module to be vertically installed in a filter vessel while enabling the filtrate to be collected from both the top and bottom ends of the hollow fiber module. The present invention further relates to a hoisting accessory not only for easily installing a long hollow fiber module in a filter vessel but also for easily removing the hollow fiber module upward from the filter vessel.

2. Related Art

In conventional filtration equipment using hollow fiber modules, the hollow fiber modules are simply suspended from a watertight partition, or module support, horizontally disposed in a filter vessel, wherein the filtrate is collected on the upper side of the hollow fiber modules and then withdrawn, or discharged, out of the filter vessel.

More specifically, each of the hollow fiber modules used in the conventional filtration equipment comprises a large number of porous hollow fibers having open top and bottom ends and enclosed in a cylindrical housing having the bottom end thereof covered by a lower header, or lower manifold, defining a lower filtrate collection chamber having no outlet port, and the cylindrical housing has a number of perforations formed through the longitudinal wall thereof for passing feed water therethrough. The filter vessel is partitioned with the watertight partition horizontally disposed therein to form a common upper filtrate collection compartment provided for all the hollow fiber modules and disposed on the upper side of the hollow fiber modules. Feed water entering the cylindrical housings of the hollow fiber modules through their perforations is allowed to permeate porous hollow fibers substantially all over the longitudinal length thereof by means of a hydraulic pressure to thereby effect filtration of the feed water through the walls, or membranes, of the porous hollow fibers into the bores thereof, through which the filtrate is then moved simultaneously downward and upward and then collected in the respective lower filtrate collection chambers of the hollow fiber modules and the common upper filtrate collection compartment. Every hollow fiber module is provided with a conduit, or central tube, extending from the lower filtrate collection chamber thereof to the common upper filtrate collection compartment. The filtrate collected in the lower filtrate collection chambers of the hollow fiber modules is transported, or shunted, therefrom through the conduits of the hollow fiber modules to the common upper filtrate collection compartment. Accordingly, all the filtrate is withdrawn, or discharged, out of the filter vessel via the above-mentioned common upper filtrate collection compartment located in the upper part of the filter vessel.

Thus, the foregoing conventional filtration equipment using the hollow fiber modules, though it is of a system wherein the filtrate is collected from both ends of every porous hollow fiber, necessitates the comparatively thin conduits, or central tubes, running from the respective lower filtrate collection chambers of the hollow fiber modules to the top ends thereof to transport, or shunt, the filtrate collected in the lower filtrate collection chambers into the common upper filtrate collection compartment.

This entails addition of a pressure loss through the conduits to the resistance of the membranes of the porous hollow fibers to permeation of water. As a result, the outer membrane surfaces of the upper portions of the porous hollow fibers are more liable to fouling than the outer membrane surfaces of the lower portions of the porous hollow fibers. Hence, it is impossible efficiently to use the porous hollow fibers substantially all over the longitudinal length thereof. Further, since the conduits are provided inside the respective hollow fiber modules, spaces occupied by the conduits cannot be filled with porous hollow fibers to lower the filtration efficiency of the hollow fiber modules.

A filter vessel designed to solve the foregoing problems was proposed, which comprises upper and lower watertight partitions horizontally disposed in the filter vessel to form upper, intermediate and lower compartments, and a plurality of hollow fiber modules installed in the intermediate compartment, and wherein feed water fed into the intermediate compartment is filtered through the walls of porous hollow fibers in the hollow fiber modules, while the filtrate is collected simultaneously into the upper and lower compartments via the open top and bottom ends of the porous hollow fibers and then discharged from the upper and lower compartments out of the filter vessel (Japanese Patent Laid-Open No. 197,106/1987). In this filter vessel, however, each hollow fiber module is watertightly joined with a lower filtrate collection tube thrusted through the lower watertight partition by means of a connector to communicate with the lower compartment via the lower filtrate collection tube. This joining work is very troublesome and requires skilled workmen. Furthermore, the hollow fiber modules, lower filtrate collection tubes, connectors, etc. must be very high in dimensional accuracy because the hollow fiber modules are watertightly fixed between the upper watertight partition and the respective lower filtrate collection tubes by means of the respective connectors. Moreover, elongation or shrinkage of the hollow fiber modules, the lower filtrate collection tubes, etc. due to a change in temperature sometimes makes it troublesome not only to install but also to remove the hollow fiber modules.

Accordingly, an object of the present invention is to provide filtration equipment wherein a hollow fiber module(s) can be easily installed in a filter vessel and easily removed from the filter vessel, and wherein porous hollow fibers can be efficiently used substantially all over the longitudinal length thereof and the filtration efficiency of the hollow fiber module(s) can be enhanced.

A hollow fiber module is such a long element as to be poor in workability and make the handling thereof dangerous. Accordingly, another object of the present invention is to provide a hoisting accessory for enabling installation and removal of a hollow fiber module to be quickly, more easily and safely carried out.

SUMMARY OF THE INVENTION

In accordance with the present invention, there is provided filtration equipment comprising a filter vessel, a first fluid-tight partition and a second fluid-tight partition horizontally disposed at upper and lower positions, respectively, remote from each other in the filter vessel to form a first compartment, a second compartment and a third compartment in this order from above, and a hollow fiber module having upper and lower filtrate outlet ports, vertically disposed in the second compartment, upward-detachably, or upward-removably, fixed in the filter vessel, and fluid-tightly joined with a lower water collection tube communicating with the third compartment by means of a jointing means capable of vertical elastic movement; wherein fluid fed into the second compartment is filtered through the walls of porous hollow fibers in the hollow fiber module, while the filtrate is conducted, or guided, into the first compartment via the upper filtrate outlet port of the hollow fiber module as well as into the third compartment via the lower filtrate outlet port of the hollow fiber module and the lower water collection tube, and the filtrate collected in the first and third compartments is then withdrawn, or discharged, therefrom out of the filter vessel.

In the foregoing filtration equipment, the above-mentioned hollow fiber module is usually and preferably disposed along with at least one hollow fiber module having upper and lower filtrate outlet ports, vertically disposed in the second compartment, upward-detachably, or upward-removably, fixed in the filter vessel, and fluid-tightly joined with a lower water collection tube communicating with the third compartment by means of a jointing means capable of vertical elastic movement. In this case, fluid fed into the second compartment is filtered through the walls of porous hollow fibers in the hollow fiber modules, while the filtrate is conducted, or guided, into the first compartment via the upper filtrate outlet ports of the hollow fiber modules as well as into the third compartment via the lower filtrate outlet ports of the hollow fiber modules and the lower water collection tubes joined with the respective hollow fiber modules, and the filtrate collected in the first and third compartments is then withdrawn, or discharged, therefrom out of the filter vessel.

In the foregoing embodiment of the filtration equipment of the present invention, the number of hollow fiber module(s) may be determined depending upon various conditions such as the kind and amount of fluid to be subjected to filtration, and the type and capacity of the hollow fiber module(s). In general, however, the number of hollow fiber module(s) may be in the range of 1 to 30, preferably 3 to 20, in the case of industrial waste water or the like, and in the range of 80 to 500, preferably 100 to 300, in the case of condensate water or the like.

In accordance with the present invention, there also is provided filtration equipment comprising a filter vessel, a number of hollow fiber modules each having upper and lower filtrate outlet ports and vertically disposed and upward-detachably, or upward-removably, fixed in the filter vessel, a common upper filtrate collection compartment provided in the upper part of the filter vessel and communicating with the upper filtrate outlet ports of said number of the hollow fiber modules, a plurality of lower manifolds each fluid-tightly joined with a plurality of hollow fiber modules as one set on the lower filtrate outlet ports side thereof by means of respective jointing means capable of vertical elastic movement and each provided for one hollow fiber module, each lower manifold being provided with at least one conduit communicating with the common upper filtrate collection compartment for conducting, or shunting, the filtrate collected in the lower manifold via the lower filtrate outlet ports of said plurality of the hollow fiber modules into the common upper filtrate collection compartment; and wherein fluid fed into the filter vessel is filtered through the walls of porous hollow fibers in the hollow fiber modules, while the filtrate is conducted, or guided, into the common upper filtrate collection compartment via the upper filtrate outlet ports of the hollow fiber modules as well as via the lower filtrate outlet ports of the hollow fiber modules, the lower manifolds and conduits thereof, and the filtrate collected in the common upper filtrate collection compartment is then withdrawn, or disk, charged, therefrom out of the filter vessel.

In this embodiment of the filtration equipment of the present invention, the number of hollow fiber modules may also be determined depending upon various conditions such as the kind and amount of fluid to be subjected to filtration, and the type and capacity of the hollow fiber modules. In general however, the number of hollow fiber modules may be in the range of 4 to 30, preferably 4 to 20, in the case of industrial waste water or the like, and in the range of 80 to 500, preferably 100 to 300, in the case of condensate water or the like.

In the foregoing embodiments of the filtration equipment of the present invention, the or each jointing means may be integrated either with the corresponding hollow fiber module or with the corresponding lower filtrate collection tube or lower manifold.

In the foregoing embodiments of the filtration equipment of the present invention, a guide plate having a perforation(s) for thrusting therethrough the lower part(s) of the hollow fiber module(s) to facilitate positioning of the hollow fiber module(s) to a predetermined position(s) is preferably provided in the filter vessel.

In the foregoing embodiments of the filtration equipment of the present invention, a bubble distributor (e.g., an air distributor in particular) for distributing gas bubbles (e.g., air bubbles in particular) to the hollow fiber module(s) to scrub porous follow fibers in the hollow fiber module(s) with the gas bubbles is usually and preferably provided in the filter vessel. As such a bubble distributor, a bubble distribution mechanism essentially comprised of a gas distributor panel having a perforation(s) just under the jointing means or the respective jointing means and a perforated bubble distributor tube(s) attached to the gas distributor panel and extending downward from the perforation or respective perforations of the gas distributer panel is especially preferably provided in the filter vessel. In this bubble distribution mechanism, gas (e.g., air in particular) fed on the lower side of the gas distributor panel is conducted, or guided, in the form of bubbles to the lower part(s) of the hollow fiber module(s) via the perforations of the perforated bubble distributor tube(s) and the perforation(s) of the gas distributor panel.

In accordance with the present invention, there is further provided a hoisting accessory comprising a pair of holding members pivotally linked crosswise with each other and having respective claws to be engaged with mutually opposite counter holes diametrically provided in the top end portion of a hollow fiber module to be not only vertically installed in a filter vessel but also removed upward from the filter vessel, a pair of linkage-forming members pivotally linked with the respective holding members to form a parallelogrammatic linkage structure, and a lifting member pivotally linked with the linkage-forming members where the linkage-forming members are pivotally linked with each other; a pair of the claws being capable of being respectively engaged with a pair of the mutually opposite counter holes of the hollow fiber module by hoisting the lifting member.

BRIEF DESCRIPTION OF THE DRAWINGS

The foregoing and other objects, features and advantages of the present invention will be better understood from the following description taken in connection with the accompanying drawings, in which.

BEST MODES FOR CARYYING OUT THE INVENTION

Although the filtration equipment of the present invention can be used for filtration of a variety of fluids, the term "feed water" is used as representing an example of the object of filtration in the following Examples. Further, although a variety of gases can be used for scrubbing therewith porous hollow fibers, air is used in the following Examples from a practical point of view. Example 1

Figure 1:
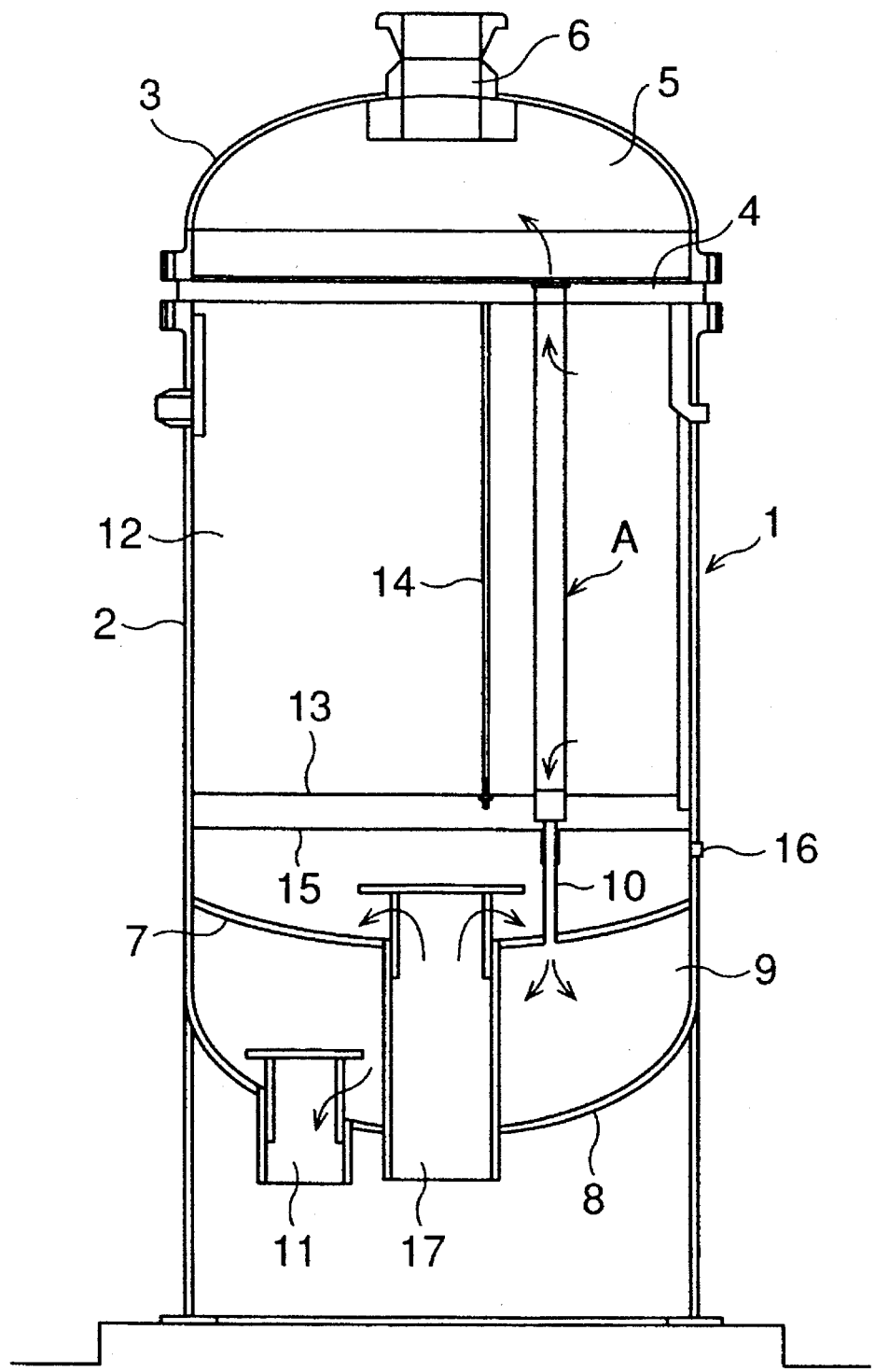
FIG. 1 is a schematic sectional view of an example of filtration equipment using hollow fiber modules according to the present invention.
Figure 2:
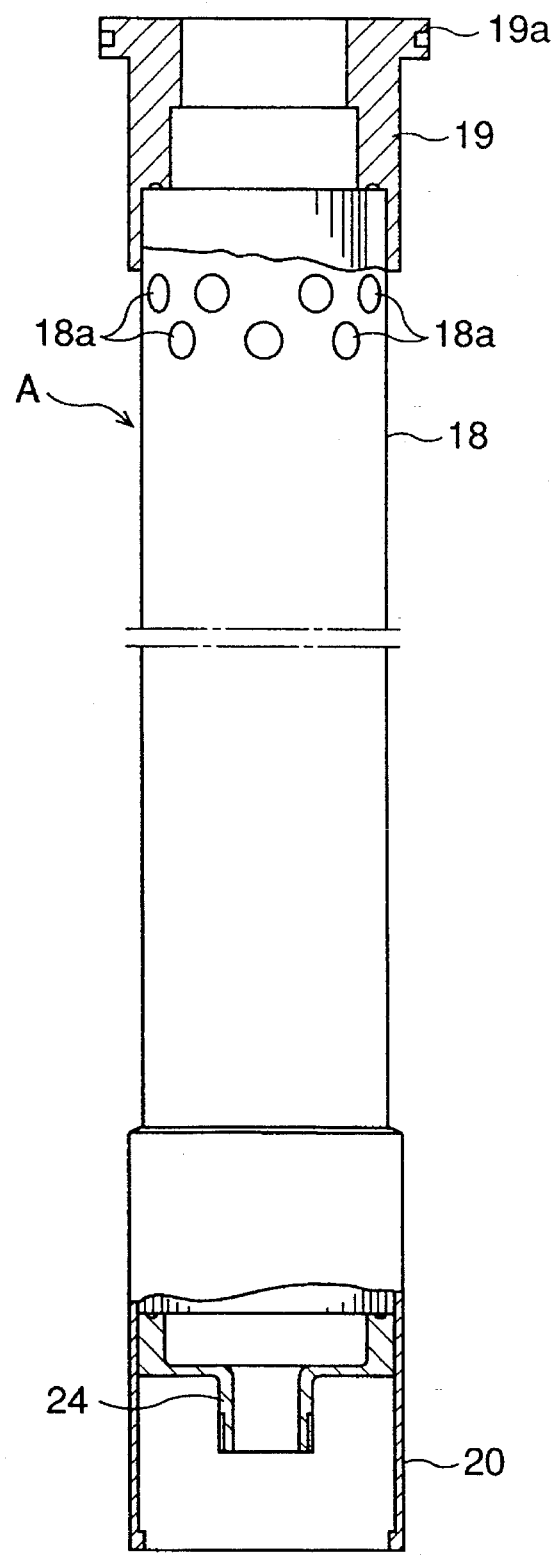
FIG. 2 is a side view of a hollow fiber module as shown in FIG. 1.
Figure 3:
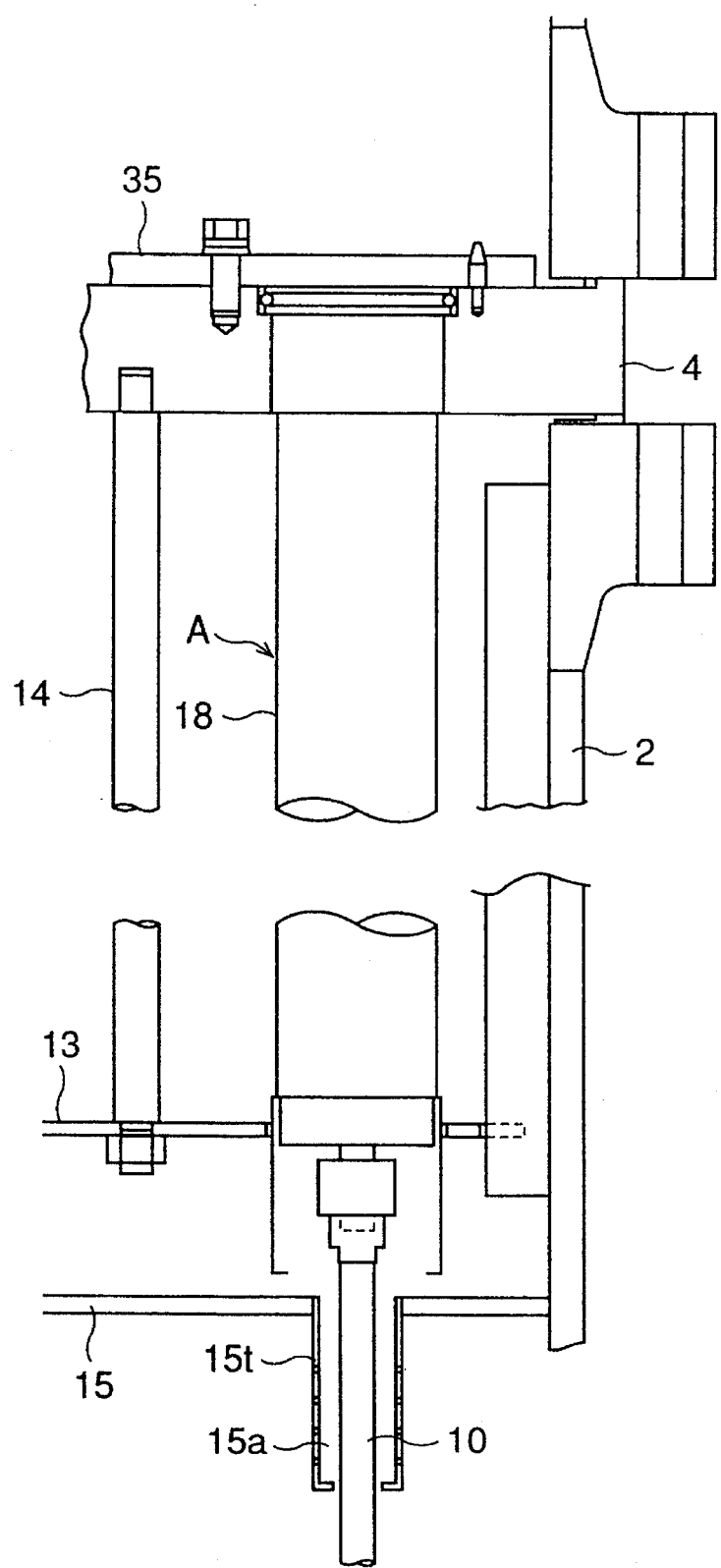
FIG. 3 is a longitudinal sectional view illustrating a fixed state of the hollow fiber module of FIG. 2.
Figure 4:
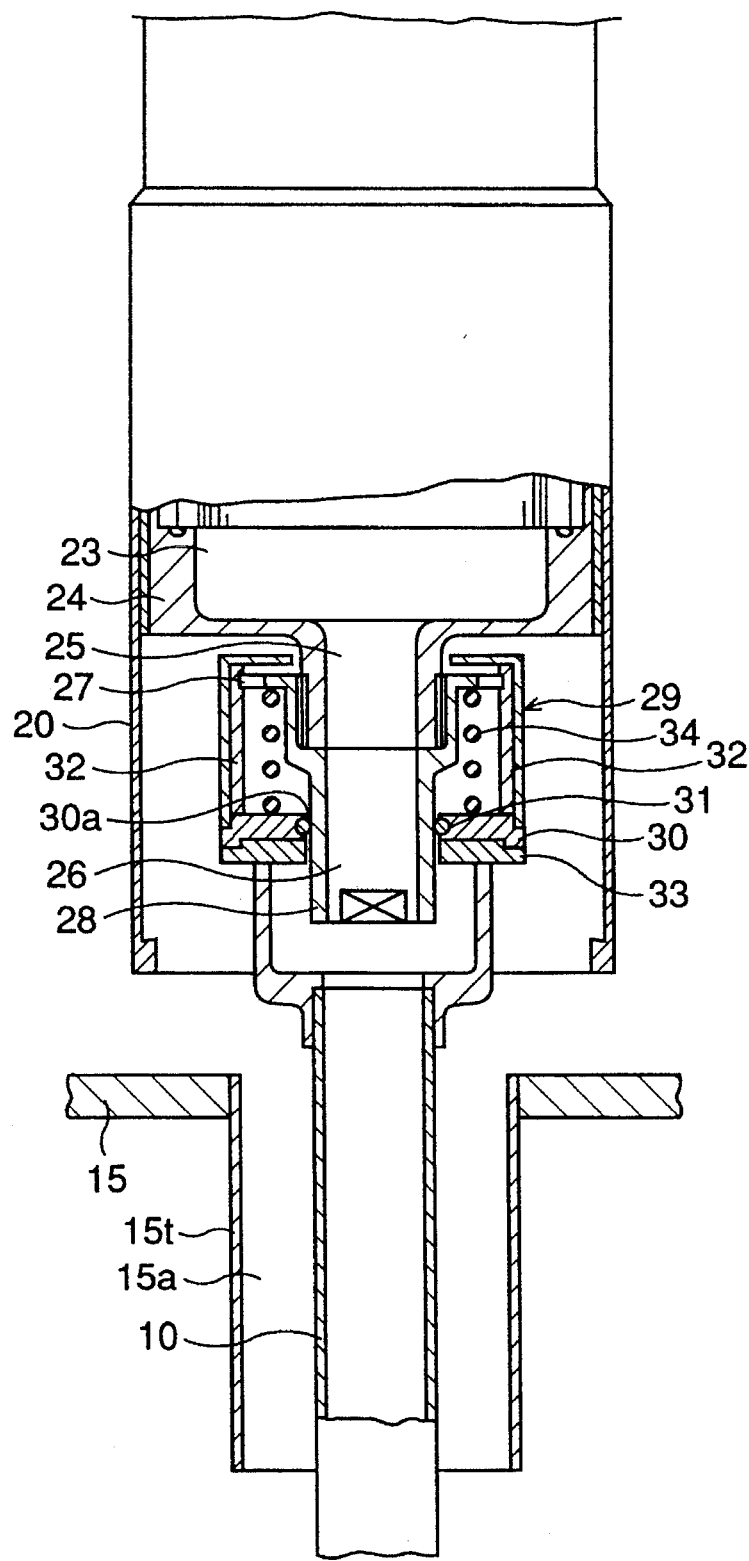
FIG. 4 is a longitudinal sectional view illustrating a state of the hollow fiber module of FIG. 2 joined with a lower filtrate collection tube.

FIG. 1 is a schematic sectional view of an example of filtration equipment using hollow fiber modules according to the present invention. Only one hollow fiber module A is illustrated representatively in FIG. 1, but actually the filtration equipment includes a number of hollow fiber modules A. FIG. 2 is a side view of a hollow fiber module as shown in FIG. 1. FIG. 3 is a longitudinal sectional view illustrating a fixed state of the hollow fiber module of FIG. 2. FIG. 4 is a longitudinal sectional view illustrating a state of the hollow fiber module of FIG. 2 joined with a lower filtrate collection tube.

As shown in FIG. 1, a filter vessel 1 long in the vertical direction thereof includes a first compartment 5 located inside an upper end plate 3, or upper end cover, attached on the upper side of a shell plate 2 surrounding the body of the filter vessel 1, and partitioned off from the body with an upper watertight partition 4. The upper end plate 3 is provided at the top thereof with an upper filtrate outlet 6 through which the filtrate collected in the first compartment 5 is withdrawn, or discharged, out of the filter vessel 1. The watertight partition 4 is interposed between the upper end plate 3 and the upper end of the shell plate 2.

As also shown in FIG. 1, the lower part of the filter vessel 1 is partitioned off with a lower watertight partition 7 to form a third compartment 9 between the lower watertight partition 7 and a lower end plate 8, or lower end cover, welded with the shell plate 2. The lower watertight partition 7 is fitted with lower filtrate collection tubes 10 communicating with the third compartment 9 and directed upward while corresponding to the respective positions of the hollow fiber modules A installed in the filter vessel 1. The lower end plate 8 is provided with a lower filtrate outlet 11 through which the filtrate collected in the third compartment 9 is withdrawn, or discharged, out of the filter vessel 1.

A second compartment 12 formed between the upper watertight partition 4 and the lower watertight partition 7 is fed with feed water via a feed water feeding tube 17. The second compartment 12 is provided with a thin guide plate 13 via support rods 14, or tie rods. Only one support rod 14, or tie rod, is illustrated representatively in FIG. 1, but a plurality of support rods are generally used to support the guide plate 13. The guide plate 13 has perforations in given positions thereof for thrusting therethrough the corresponding lower parts of the hollow fiber modules A. The guide plate 13 facilitates positioning and hence installation of the hollow fiber modules A inside the shell plate 2 of the filter vessel 1 when the hollow fiber modules A are thrusted one by one through the respective perforations of the guide plate 13. An air bubble distribution mechanism comprised of an air distributor panel 15 having perforations just under the respective jointing means and perforated bubble distributor tubes 15t attached to the air distributor panel 15 and extending downward from the respective perforations of the air distributer panel 15 is horizontally disposed between the guide plate 13 and the lower watertight partition 7 with gaps 15a (see FIGS. 3 and 4) around the respective lower filtrate collection tubes 10. When porous hollow fibers in the hollow fiber modules A are to be vibrated and thus scrubbed with air bubbles to dislodge, or exfoliate, foulants deposited on the outer membrane surfaces of the porous hollow fibers through filtration of feed water, compressed air is fed on the lower side of the air distributor panel 15 from an air feeding inlet 16 to form an air layer separated from water thereunder and having a thickness smaller than the length of the perforated bubble distributor tubes 15t. Air of the air layer is pushed out to the gaps 15a via the perforations of the perforated bubble distributor tubes 15t and rises up in the form of air bubbles to reach the lower parts of the hollow fiber modules A. Substantially all the amount of scrubbing air fed is used to scrub therewith the porous hollow fibers in the hollow fiber modules A. On the other hand, the abovementioned feed water feeding tube 17 is thrusted through the lower end plate 8 and the third compartment 9 up to a certain position below the bubble distribution mechanism. Feed water is fed through the feed water feeding tube 17, while waste water resulting from the air scrubbing is drained out of the filter vessel 1 through the feed water feeding tube 17 as well.

The structure of a hollow fiber module A will now be described in detail.

Figure 5:
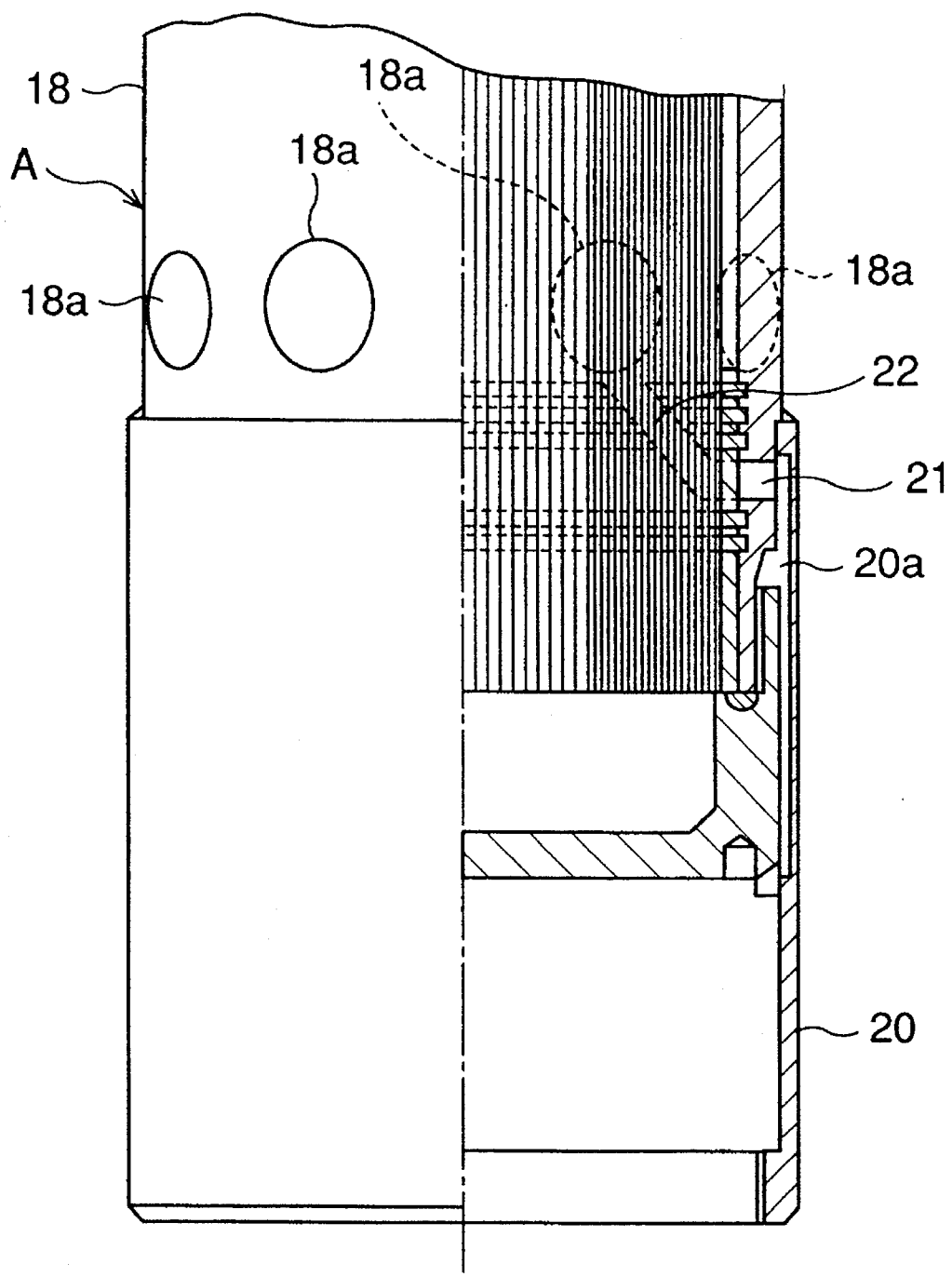
FIG. 5 is a longitudinal sectional view of the lower part of the hollow fiber module of FIG. 2.

The upper and lower end portions of the porous hollow fibers arrayed inside the cylindrical housing 18 of the hollow fiber module A are bound, or potted, without occlusion of the central bores of the porous hollow fibers. As shown in FIG. 2, the upper part of the cylindrical tubular housing 18 of the hollow fiber module A is fitted with a fixing ring 19 having a flange 19a for fixing the hollow fiber module A to the upper watertight partition 4. On the other hand, the lower part of the cylindrical housing 18 of the hollow fiber module A is fitted with a cylindrical cover 20 (see FIGS. 2, 4 and 5) not only for covering therewith a jointing adapter as will be described later in detail, but also for collecting bubbles of the aforementioned scrubbing air and then conducting, or guiding, the scrubbing air bubbles into the cylindrical housing 18. As illustrated in FIG. 5, an inner wall groove(s) 20a is formed in the inner wall portion of the cylindrical cover 20, while air intakes 21 corresponding to the inner wall groove(s) 20a are formed through the lower wall of the cylindrical housing 18 and inner wall air-introducing grooves 22 communicating with the corresponding air intakes 21 are further formed in the lower inner wall portion of the cylindrical housing 18. Scrubbing air bubbles collected inside the cylindrical cover 20 are conducted, or guided, to the lower parts of porous hollow fibers via the inner wall groove(s) 20a, the air intakes 21 and tile inner wall air-introducing grooves 22 to scrubb the outer membrane surfaces of the porous hollow fibers with the scrubbing air bubbles.

Feed water inflow perforations 18a (see FIGS. 2 and 5) for allowing inflow therethrough of feed water into the cylindrical housing 18 are formed through the upper and lower wall portions of the cylindrical housing 18. Feed water conducted, or guided, into the cylindrical housing 18 through the feed water inflow perforations 18a is filtered with the porous membranes of the porous hollow fibers. The filtrate is conducted upward as well as downward through the bores of the porous hollow fibers. As illustrated in FIG. 1, the filtrate conducted upward is collected in the first compartment 5, from which it is then passed through the upper filtrate outlet 6 to be withdrawn, or discharged, out of the filter vessel 1, while the filtrate conducted downward is passed through the jointing adapter and the lower filtrate collection tube 10 to be collected in the third compartment 9, from which it is then passed through the lower filtrate outlet 11 to be withdrawn, or discharged, out of the filter vessel 1.

In this Example, each hollow fiber module A is thrusted through one of insertion openings formed through the upper watertight partition 4 from above the body of the filter vessel 1 surrounded by the shell plate 2, and the lower end portion of the hollow fiber module A is further thrusted through one of the perforations of the guide plate 13 to elastically join the hollow fiber module A with the corresponding lower filtrate collection tube 10 by means of the jointing adapter provided in the lower part of the hollow fiber module A, while the flange 19a of the fixing ring 19 provided around the upper part of the cylindrical housing 18 is fixed by bolting a setting plate 35, or keep plate, on the upper watertight partition 4 with the flange 19a therebetween as shown in FIG. 3.

The jointing adapter will now be described in detail while referring mainly to FIG. 4.

The porous hollow fibers are arrayed inside the cylindrical tubular housing 18 fitted at the bottom thereof with a mouthpiece 24, or bottom fitting, (see also FIG. 2) having a lower filtrate collection chamber 23 and a filtrate discharge orifice 25. A connecting tube 28 having a filtrate discharge tube portion 26 and a flange 27 is screwed around the outer wall of the mouthpiece 24 around the filtrate discharge orifice 25 thereof. A cap member 29, or spring retainers beyond which the filtrate discharge tube portion 26 of the connecting tube 28 is jutted downward is disposed around the connecting tube 28. The cap member 29 has a bottom block plate 30, or spring stop, between which and the flange 27 a spring 34 is elastically fitted to always energize therewith the cap member 29 downward. The filtrate discharge tube portion 26 of the connecting tube 28 is vertically-movably thrusted through a hole 30a formed through the bottom block plate 30. An O-ring 31 fitted along the periphery of the hole 30a prevents the filtrate from leaking out of the adapter and also prevents waste water resulting from the air scrubbing from entering the lower filtrate collection tube 10. Additionally stated, guide rods 32 extending from the ceiling of the cap member 29 to the bottom of the cap member 29 are run through notches formed in the flange 27 of the cap member 29 to hinder revolution of the cap member 29 around the axis thereof while ensuring only vertical movement of the cap member 29 in relation with the connecting tube 28.

On the other hand, the upper part of the lower filtrate collection tube 10 is different and larger in diameter than the rest of the lower filtrate collection tube 10. The upper end of the lower filtrate collection tube 10 is in contact with a rubber sheet 33, or gasket, adhered to the lower surface of the bottom block plate 30, or spring stop, to keep watertight the interface between the adapter and the lower filtrate collection tube 10 by means of the elastic force, or resilience, of the spring 34 of the adapter.

As described hereinbefore, when the hollow fiber module A is inserted into the body of the filter vessel 1 from above to have the lower part of the hollow fiber module A passed through the guide plate 13 and positioned to a predetermined position corresponding to a lower filtrate collection tube 10, the adapter provided in the lower part of the hollow fiber module A is automatically joined with the lower filtrate collection tube 10 while ensuring the watertight interface therebetween to enable the filtrate to be collected through the top and bottom ends of the hollow fiber module A. In the foregoing operation, no special works are necessary for connecting the lower part of the hollow fiber module A with the lower filtrate collection tube 10. This well facilitates not only the operation of installing a number of the hollow fiber modules A but also the operation of removing said number of the hollow fiber modules A. Further, even if there is some deviation of the axis of the lower filtrate collection tube 10 from the axis of the jointing adapter provided in the lower part of the hollow fiber module A, this axial deviation can be absorbed in this Example by the different and larger diameter of the upper part of the lower filtrate collection tube 10 than that of the rest thereof. Furthermore, elongation or shrinkage of the hollow fiber module A due to a change in temperature can be absorbed by downward or upward movement of the cap member 29 of the adapter because the cap member 29 is vertically movable.

Figure 6:
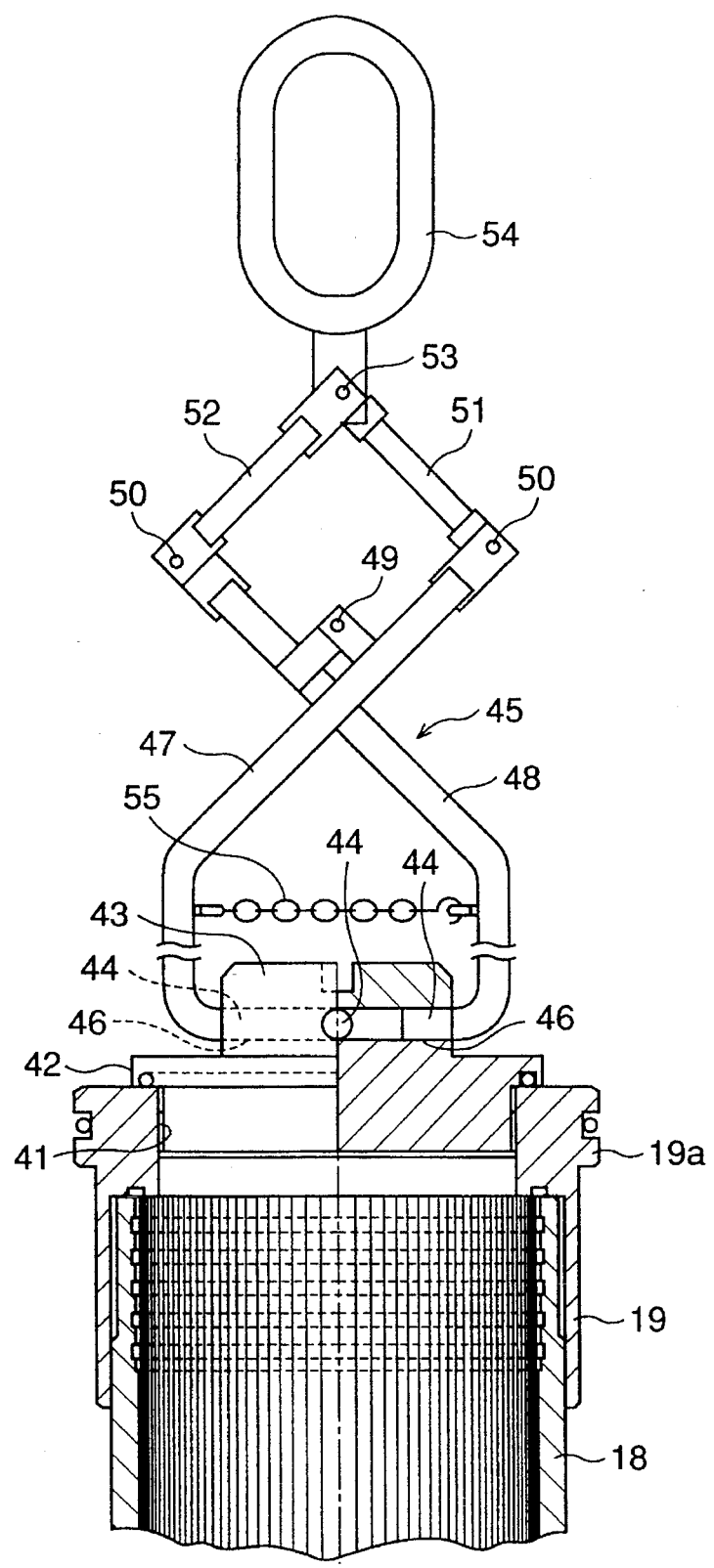
FIG. 6 is an illustration of a hoisting accessory for a hollow fiber module.

FIG. 6 is an illustration of a hoisting accessory to be used in the operation of not only installation but also removal of a hollow fiber module A.

A female thread portion 41 is formed in the upper internal wall portion of the fixing ring 19 fixed in the upper part of the hollow fiber module A. An upper cap 42 is screwed into the female thread portion 41. Four engagement holes 44 are diametrically formed at equal pitches therebetween in the top portion 43 of the upper cap 42. Two opposite engagement holes 44 are to be engaged with the counter engagement claws 46 of tongs 45.

Principal rods 47 and 48 having the respective engagement claws 46 formed in the respective tips thereof are crosswise disposed and pivotally supported by a pivot shaft 49 near the intersectional portions thereof. The end portions of the principal rods 47 and 48 opposite to the respective engagement claws 46 thereof are pivotally attached to secondary rods 51 and 52, respectively, by means of respective pivot shafts 50. The top portions of the secondary rods 51 and 52 are pivotally attached to each other by means of a pivot shaft 53 to form a parallelogrammtic linkage structure. When a lifting piece 54 also attached to the pivot shaft 53 is hoisted upward, the distance between the engagement claws 46 of the principal rods 47 and 48 is reduced to engage the engagement claws 46 with two engagement holes 44 of the upper cap 42. When the lifting piece 54 is further hoisted with a crane or the like, the long hollow fiber module A can be suspended from above.

After the hollow fiber module A is installed at a predetermined position in the body of the filter vessel 1 surrounded by the shell plate 2, the lifting piece 54 is lowered a little to increase the distance between the engagement claws 46 of the principal rods 47 and 48, whereby the engagement claws 46 are disengaged, or detached, from the respective engagement holes 44. In the course of this operation, the maximum increase in the distance between the engagement claws is regulated by a chain 55 attached to and provided between the principal rods 47 and 48.

Additionally stated, although the jointing adapter capable of vertical elastic movement is provided in the lower part of the hollow fiber module A to watertightly join the hollow fiber module A with the lower filtrate collection tube 10 by means of the adapter in the foregoing Example 1, the lower filtrate collection tube 10 may alternatively be fitted with a jointing adapter capable of functioning like the above-mentioned jointing adapter.

EXAMPLE 2

Figure 7:
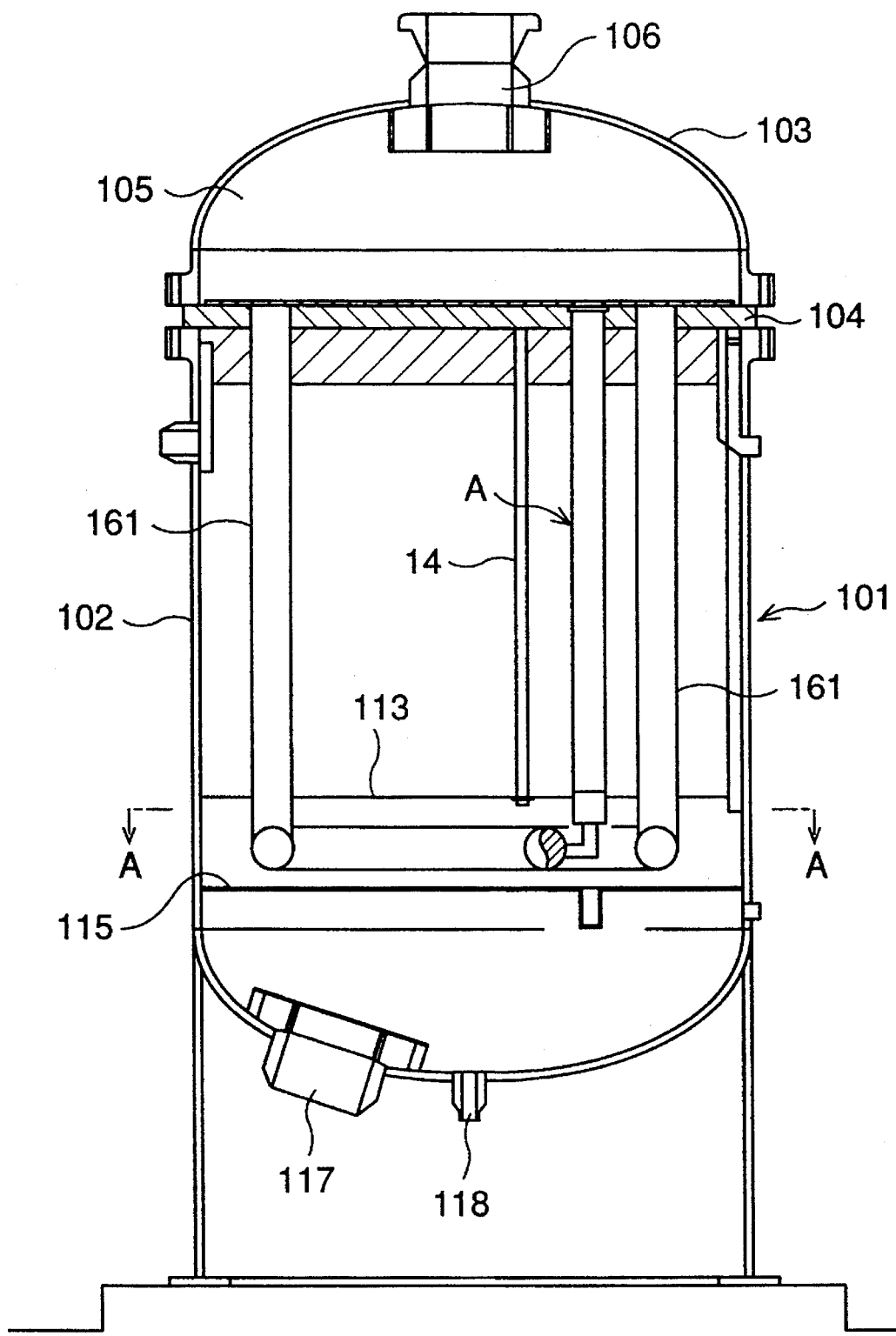
FIG. 7 is a schematic sectional view of another example of filtration equipment according to the present invention.
Figure 8:
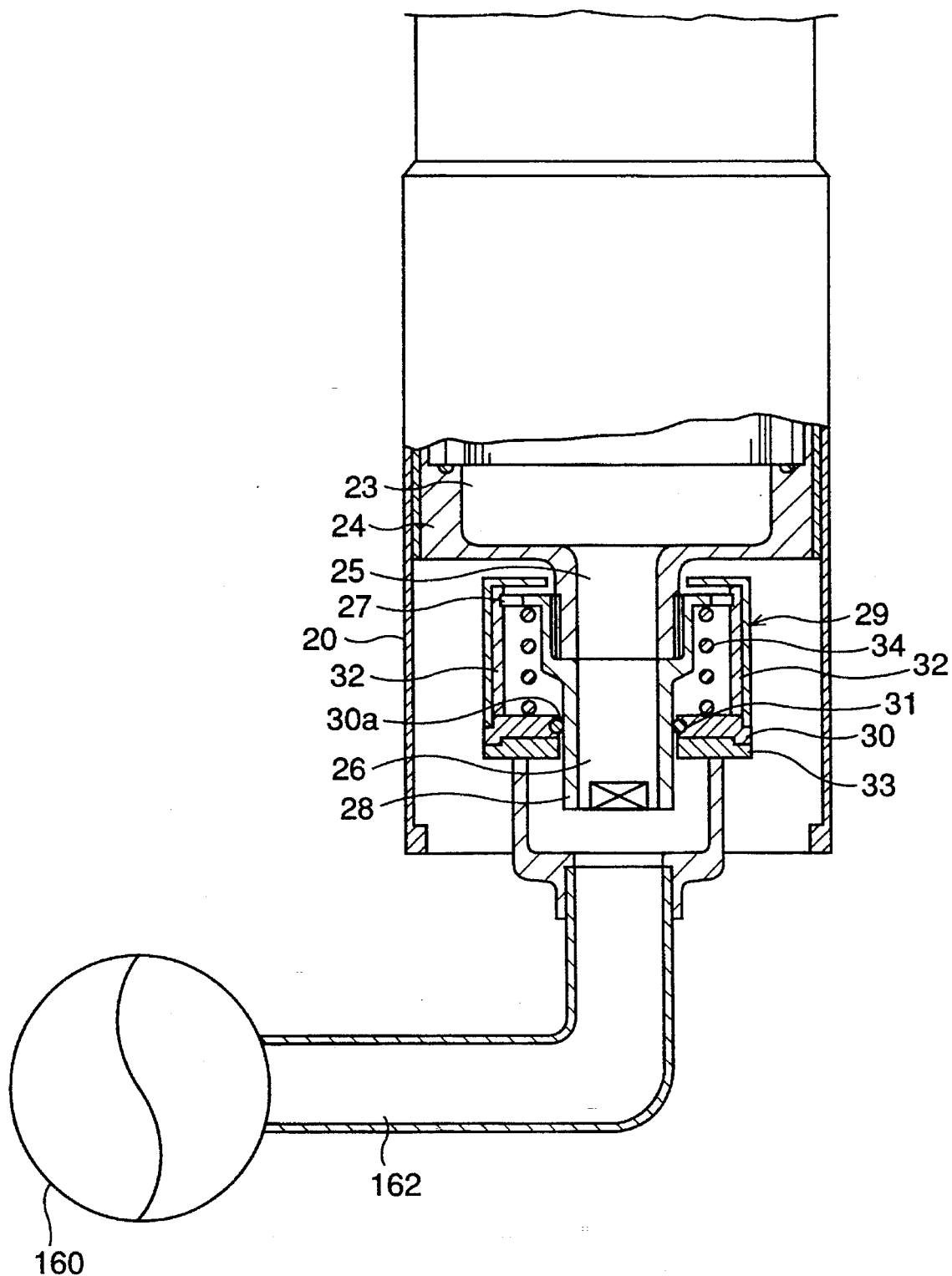
FIG. 8 is an enlarged sectional view of the adapter of a hollow fiber module as shown in FIG.7 and surroundings thereof.
Figure 9:
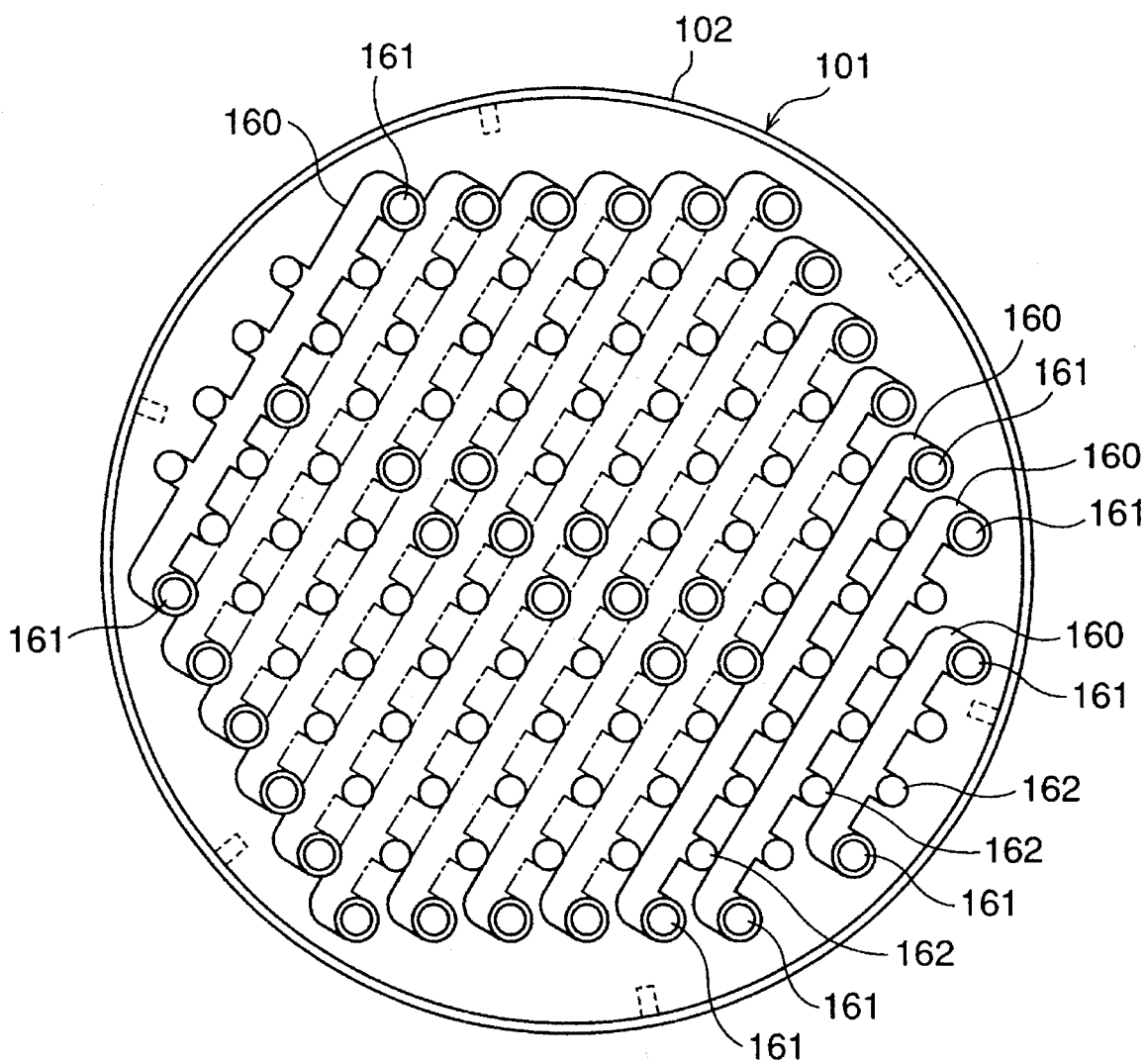
FIG. 9 is a sectional plan view of the filtration equipment taken along line A—A of FIG. 7 and viewed in the direction of arrows.

FIGS. 7, 8 and 9 illustrate another example of filtration equipments according to the present invention. FIG. 7 is a schematic sectional view of the filtration equipment. Only one hollow fiber module A is illustrated representatively in FIG. 7, but actually the filtration equipment includes a number of hollow fiber modules A. FIG. 8 is an enlarged sectional view of the adapter of a hollow fiber module as shown in FIG.7 and surroundings thereof. FIG. 9 is a sectional plan view of the filtration equipment taken along line A—A of FIG. 7 and viewed in the direction of arrows.

In the foregoing Example 1, part of the filtrate filtered through the walls of the porous hollow fibers in the hollow fiber modules A is once collected in the third compartment 9 located under the lower filtrate collection tubes 10, and then withdrawn, or discharged, out of the filtrate vessel 1 via the lower filtrate outlet 11. By contrast, in Example 2, no third compartment of the kind as described above is provided in a filter vessel 101, and all the filtrate collected from the bottoms of hollow fiber modules A is shunted, or guided, to a common upper filtrate collection compartment 105 via conduits 161, as will be described later, to be combined with the filtrate collected from the tops of the hollow fiber modules A, as shown in FIG. 7.

In Example 2, every hollow fiber module A has the same configuration including the adapter thereof as in Example 1. A plurality of lower tubular headers 160 (see FIGS. 8 and 9) each provided for a plurality of hollow fiber modules A as one set are horizontally disposed between a bubble distribution mechanism 115 of the same kind as in Example 1 and a guide plate 113 fitted with support rods 14, or tie rods, as shown in FIG. 7. Only one support rod 14, or tie rod, is illustrated representatively in FIG. 7, but a plurality of support rods are generally, used to support the guide plate 113. These lower tubular headers 160 are each fitted, e.g., welded, at least at both end portions thereof with vertical conduits 161 (see FIGS. 7 and 9) thrusted through a watertight partition 104 (see FIG. 7) and communicating with the common upper filtrate collection compartment 105. The lower tubular headers 160 are each further fitted, e.g., welded, with L-curved lower filtrate collection tubes 162 (see FIGS. 8 and 9) each provided for one hollow fiber module A to form respective lower manifolds. The bottom end portion of each hollow fiber module A is joined with the diameter-increased top portion of one of the L-curved lower filtrate collection tubes 162 in the same manner as in Example 1, as illustrated in FIG. 8, wherein the same reference numerals as in FIG. 4 refer to the same members, parts or portions as in FIG. 4.

Thus, according to Example 2, the filter vessel 101 includes a plurality of groups each consisting of a plurality of hollow fiber modules A juxtaposed in a lateral direction and joined with respective L-curved lower filtrate collection tubes 162, as illustrated in FIG. 9. The filtrate collected from the bottoms of the hollow fiber modules A is passed through the respective lower filtrate collection tubes 162, the lower tubular headers 160 for the respective groups and the conduits 161 for the respective groups to be collected into the upper filtrate collection compartment 105 and combined with the filtrate collected from the tops of the hollow fiber modules A. All the filtrate is withdrawn, or discharged, out of the filter vessel 101 via an upper filtrate outlet 106 provided at the top of an upper end plate 103 disposed on a shell plate 102 with the watertight partition 104 therebetween, as shown in FIG. 7.

Additionally stated, feed water is fed into the filter vessel 101 via a feed water inlet 117 while waste water resulting from air scrubbing is discharged out of the filter vessel 101 via a waste water outlet 118, as shown in FIG. 7.

In the aforementioned Example 1, pipings for combining the filtrate from the first compartment 5 with the filtrate from the third compartment 9 must be provided outside the filter vessel 1. By contrast, in Example 2, the filtrate from the tops of the hollow fiber modules A can be combined with the filtrate from the bottoms of the hollow fiber modules A inside the filter vessel 101 to reduce the piping work after installation of the filter vessel 101 while decreasing the number of pipings outside the filter vessel 101 to give a streamlined appearance to filtration facilities.

As described hereinbefore, according to the present invention, the filtrate can be collected from both the top and bottom ends of long hollow fiber modules with no central tube, and then withdrawn, or discharged, out of a filter vessel to enable the hollow fiber modules to be efficiently used substantially all over the longitudinal length thereof with a high filtration efficiency.

Even in the embodiment of the filtration equipment of the present invention wherein lower manifolds are used, the filtrate collected in the lower manifolds can be transported to a common upper filtrate collection compartment through comparatively thick conduits to minimize the pressure loss through the conduits.

According to the present invention, merely mounting a hollow fiber module from above enables the hollow fiber module to be automatically joined with a lower filtrate collection tube or a lower manifold by means of a jointing means to make easy the work of joining, or connecting, the hollow fiber module with the lower filtrate collection tube or the lower manifold. This facilitates not only the operation of installing hollow fiber modules but also the operation of removing the hollow fiber modules, while improving the workability thereof including the maintainability and inspectability thereof. Furthermore, since the jointing means is capable of vertical elastic movement, elongation and shrinkage of the hollow fiber module due to a change in temperature can be absorbed to prevent the hollow fiber module and the like from being damaged.

In the filtration equipment of the present invention, each jointing means is provided either on the side of the corresponding hollow fiber module or on the side of the corresponding lower filtrate collection tube or lower manifold. Thus, any damage, or breakdown, happens, mere replacement of the damaged part alone with a new one will suffice without seriously affecting the whole filtration equipment.

A guide plate that may be provided in the filter vessel of the filtration equipment of the present invention permits the easy positioning of every hollow fiber module to a predetermined position.

When the outer membrane surfaces of porous hollow fibers in the hollow fiber modules are to be scrubbed with gas bubbles such as air bubbles in particular, a bubble distribution mechanism that may be provided in the filter vessel of the filtration equipment of the present invention enables the bubbles to be fed into the hollow fiber modules without wasting any bubbles.

Further, use of the hoisting accessory of the present invention makes it easy, quick and safe to install or remove a long hollow fiber module.

What is claimed is:

1. Filtration equipment comprising a filter vessel, a first fluid-tight partition and a second fluid-tight partition horizontally disposed at upper and lower positions respectively remote from each other in said filter vessel to form a first compartment, a second compartment and a third compartment in this order from above, and a hollow fiber modules having upper and lower filtrate outlet ports, vertically disposed in said second compartment, said hollow fiber modules are individually upward-detachably fixed in said filter vessel, and having the ends fitted in said partitions, and fluid tightly joined with a lower water collection tube communicating with said third compartment by means of jointing means capable of vertical elastic movement; an inlet connected to said second compartment, wherein fluid fed into said second compartment through said inlet is filtered through the walls of porous hollow fibers in said hollow fiber modules, while the filtrate is conducted in to said first compartment via said upper filtrate outlet ports of said hollow fiber modules as into said third compartment via said lower filtrate outlet ports of said hollow fiber modules and said lower water collection tube, said filtrate collected in said first and third compartments is then discharged therefrom out of said vessel through outlet means.

2. Filtration equipment as claimed in claim 1, wherein a guide plate having a perforation for thrusting therethrough the lower part of said hollow fiber module to facilitate positioning of said hollow fiber module to a predetermined position is provided in said filter vessel.

3. Filtration equipment as claimed in claim 1, wherein a bubble distribution mechanism essentially consisting of a gas distributor panel having a perforation just under said jointing means and a perforated bubble distributor tube attached to said gas distributor panel and extending downward from said perforation of said gas distributer panel is provided in said filter vessel; and wherein gas fed on the lower side of said gas distributor panel is conducted in the form of bubbles to the lower part of said hollow fiber module via the perforations of said perforated bubble distributor tube and said perforation of said gas distributor panel.

4. Filtration equipment as claimed in claim 1, wherein said hollow fiber module is disposed along with at least one hollow fiber module having upper and lower filtrate outlet ports, vertically disposed in said second compartment, upward-detachably fixed in said filter vessel, and fluid-tightly joined with a lower water collection tube communicating with said third compartment by means of a jointing means capable of vertical elastic movement; and wherein fluid fed into said second compartment is filtered through the walls of porous hollow fibers in the hollow fiber modules, while the filtrate is conducted into said first compartment via the upper filtrate outlet ports of said hollow fiber modules as well as into said third compartment via the lower filtrate outlet ports of said hollow fiber modules and the lower water collection tubes joined with the respective hollow fiber modules, and the filtrate collected in said first and third compartments is then discharged therefrom out of said filter vessel.

5. Filtration equipment as claimed in claim 4, wherein a guide plate having perforations for thrusting therethrough the lower parts of said hollow fiber modules to facilitate positioning of said hollow fiber modules to predetermined positions is provided in said filter vessel.

6. Filtration equipment as claimed in claim 4, wherein a bubble distribution mechanism essentially consisting of a gas distributor panel having perforations just under the respective jointing means and perforated bubble distributor tubes attached to said gas distributor panel and extending downward from the respective perforations of said gas distributer panel is provided in said filter vessel; and wherein gas fed on the lower side of said gas distributor panel is conducted in the form of bubbles to the lower parts of said hollow fiber modules via the perforations of said perforated bubble distributor tubes and said perforations of said gas distributor panel.

7. Filtration equipment as claimed in claim 1, wherein the jointing means is integrated with the hollow fiber module.

8. Filtration equipment as claimed in claim 1, wherein the jointing means is integrated with the lower filtrate collection tube.

9. Filtration equipment comprising a filter vessel, a number of hollow fiber modules each having upper and lower filtrate outlet ports and vertically disposed and individually upward-detachably fixed in said filter vessel, a common upper filtrate collection compartment provided in an upper part of said filter vessel and communicating with the upper filtrate outlet ports of said number of said hollow fiber modules, a plurality of lower manifolds each fluid-tightly joined with a plurality of hollow fiber modules and set on the lower filtrate outlet ports thereof by means of respective jointing means capable of vertical elastic movement and each provided for one hollow fiber module, each lower manifold being provided with at least one conduit communicating with said common upper filtrate collection compartment for conducting the filtrate outlet ports of said plurality of the hollow fiber modules into said common upper filtrate collection compartment; an inlet connected to said filtering vessel, and wherein fluid fed into said filter vessel through said inlet is filtered through the walls of porous hollow fibers in the hollow fiber modules, while the filtrate is conducted into said common upper filtrate collection compartment via said upper filtrate outlet ports of said hollow fiber modules as well as via the lower filtrate outlet ports of said hollow fiber modules, said lower manifolds and conduits thereof, and the filtrate collected in said common upper filtrate collection compartment is then discharged therefrom out of the filter vessel.

10. Filtration equipment as claimed in claim 9, wherein each jointing means is integrated with each hollow fiber module.

11. Filtration equipment as claimed in claim 9, wherein each jointing means is integrated with corresponding lower manifold.

12. Filtration equipment as claimed in claim 9, wherein a guide plate having perforations for thrusting therethrough the lower parts of said hollow fiber modules to facilitate positioning of said hollow fiber modules to predetermined positions is provided in said filter vessel.

13. Filtration equipment as claimed in claim 9, wherein a bubble distributing mechanism essentially consisting of a gas distributor panel having perforations just under the respective jointing means and perforated bubble distributor tubes attached to said gas distributor panel and extending downward from the respective perforations of said gas distributer panel is provided in said filter vessel; and wherein gas fed on the lower side of said gas distributor panel is conducted in the form of bubbles to the lower parts of said hollow fiber modules via the perforations of said perforated bubble distributor tubes and said perforations of said gas distributor panel.

* * * * *